United States Patent
Han et al.

(10) Patent No.: US 10,936,489 B2
(45) Date of Patent: Mar. 2, 2021

(54) METHOD, DEVICE AND COMPUTER PROGRAM PRODUCT FOR MANAGING METADATA AT A CONTROL DEVICE

(71) Applicant: EMC IP Holding Company LLC, Hopkinton, MA (US)

(72) Inventors: Geng Han, Beijing (CN); Yousheng Liu, Beijing (CN); Xiongcheng Li, Beijing (CN); Lifeng Yang, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/512,644

(22) Filed: Jul. 16, 2019

(65) Prior Publication Data
US 2020/0034291 A1 Jan. 30, 2020

(30) Foreign Application Priority Data
Jul. 27, 2018 (CN) .......................... 201810848195.3

(51) Int. Cl.
*G06F 12/0804* (2016.01)
*G06F 12/06* (2006.01)

(52) U.S. Cl.
CPC ...... *G06F 12/0804* (2013.01); *G06F 12/0646* (2013.01); *G06F 2212/1032* (2013.01); *G06F 2212/608* (2013.01)

(58) Field of Classification Search
CPC ............. G06F 12/0804; G06F 12/0646; G06F 12/084; G06F 2212/1032; G06F 2212/608; G06F 2212/7207; G06F 2212/466; G06F 2212/46
See application file for complete search history.

(56) References Cited

U.S. PATENT DOCUMENTS

| | | | |
|---|---|---|---|
| 9,069,682 B1* | 6/2015 | Veeraswamy | ......... G06F 16/172 |
| 9,135,123 B1 | 9/2015 | Armangau et al. | |
| 9,836,243 B1 | 12/2017 | Chanler et al. | |
| 10,209,909 B1 | 2/2019 | Wils et al. | |
| 10,210,067 B1 | 2/2019 | Wils | |
| 10,235,066 B1 | 3/2019 | Chen et al. | |
| 10,261,944 B1 | 4/2019 | Armangau et al. | |

(Continued)

OTHER PUBLICATIONS

Lee, C. and S. Lim, "Caching and Deferred Write of Metadata for Yaffs2 Flash File System," Ninth International Conference on Embedded and Ubiquitous Computing, 2011.*

(Continued)

*Primary Examiner* — Tracy A Warren
(74) *Attorney, Agent, or Firm* — BainwoodHuang (57) ABSTRACT

Techniques for managing metadata at a control device involve: determining, from a cache page corresponding to user data, a first region for storing raw metadata of the user data, the raw metadata including address information for storing the user data in a storage system; in response to the user data being modified, determining updated metadata of the modified user data to update the raw metadata in the first region; and copying the updated metadata to a high-speed memory shared by the control device and another control device. Accordingly, the techniques are capable of reducing the usage frequency of the high-speed memory, thereby extending the service life of the high-speed memory and reducing cost.

20 Claims, 10 Drawing Sheets

(56) References Cited

U.S. PATENT DOCUMENTS

| | | |
|---|---|---|
| 10,289,345 B1 | 5/2019 | Wils |
| 10,296,255 B1 | 5/2019 | Tummala |
| 10,402,096 B2 | 9/2019 | Sen et al. |
| 10,416,901 B1 | 9/2019 | Wils |
| 10,540,114 B2 | 1/2020 | Lv et al. |
| 10,705,918 B1 | 7/2020 | Hu et al. |
| 10,809,932 B1 | 10/2020 | Armangau et al. |
| 2013/0046918 A1* | 2/2013 | Im ....................... G06F 12/0246 711/103 |
| 2014/0108723 A1* | 4/2014 | Nowoczynski ..... G06F 12/0802 711/113 |
| 2015/0067253 A1* | 3/2015 | Madhusudana ....... G06F 3/0659 711/114 |
| 2017/0329711 A1* | 11/2017 | Greenspan .............. G06F 3/061 |
| 2018/0307425 A1* | 10/2018 | Blount ................... G06F 3/061 |

OTHER PUBLICATIONS

Lee, C. and S. Lim, "Efficient Logging of Metadata Using NVRAM and NAND Flash based File System," IEEE Transactions on Consumer Electronics, v. 58, No. 1, Feb. 2012.*

Chen, C., Yang, J., Wei, Q., Wang, C., and M. Xue, "Fine-grained Metadata Journaling on NVM," 32nd Symposium on Mass Storage Systems and Technologies (MSST), May 2016.*

* cited by examiner

METHOD, DEVICE AND COMPUTER PROGRAM PRODUCT FOR MANAGING METADATA AT A CONTROL DEVICE

CROSS-REFERENCE TO RELATED APPLICATION

This application claims priority to Chinese Patent Application No. CN201810848195.3, on file at the China National Intellectual Property Administration (CNIPA), having a filing date of Jul. 27, 2018 and having "METHOD, DEVICE AND COMPUTER PROGRAM PRODUCT FOR MANAGING METADATA AT A CONTROL DEVICE" as a title, the contents and teachings of which are herein incorporated by reference in their entirety.

FIELD

Embodiments of the present disclosure generally relate to metadata management, and more particularly to a method, device and computer program product for managing metadata at a control device.

BACKGROUND

With the development of data storage technologies, storage servers usually need to manage a storage system that contains a large number of disks. In order to provide frequent users' access to the storage system, caches are generally utilized in the storage system including a disk array to increase the speed of accessing data in the storage system. Normally the first layer of cache is a cache such as DRAM, and the second layer of cache is a high-speed memory such as NVMe.

Accompanying user's access request to the data, the user data is modified, which also causes the modification of metadata corresponding to the user data. These modified metadata, before being recorded to disks, are usually first copied from the first layer of cache to the second layer of cache, such as from the Cache page to the NVMe. This will cause the second layer of cache to age rapidly. Therefore, how to manage metadata more reasonably becomes a worthful theme.

SUMMARY

Embodiments of the present disclosure provide a method, device and computer program product for managing metadata at a control device.

In a first aspect of the present disclosure, there is provided a method for managing metadata at a control device. The method includes: determining, from a cache page corresponding to user data, a first region for storing raw metadata of the user data, the raw metadata including address information for storing the user data in a storage system; in response to the user data being modified, determining updated metadata of the modified user data to update the raw metadata in the first region; and copying the updated metadata to a high-speed memory shared by the control device and another control device.

In a second aspect of the present disclosure, there is provided a control device for managing metadata. The control device includes at least one processing unit and at least one memory. The at least one memory is coupled to the at least one processing unit and stores instructions executed by the at least one processing unit. The instructions, when executed by the at least one processing unit, cause the control device to perform actions, the actions including: determining, from a cache page corresponding to user data, a first region for storing raw metadata of the user data, the raw metadata including address information for storing the user data in a storage system; in response to the user data being modified, determining updated metadata of the modified user data to update the raw metadata in the first region; and copying the updated metadata to a high-speed memory shared by the control device and another control device.

In a third aspect of the present disclosure, there is provided a computer program product tangibly stored on a non-transient computer storage medium and including computer executable instructions which, when executed by a device, cause the device to perform any step of the method described according to the first aspect of the present disclosure.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

In the figures, the same or corresponding reference numbers represent the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "comprise without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be comprised in the following description.

Figure 1:
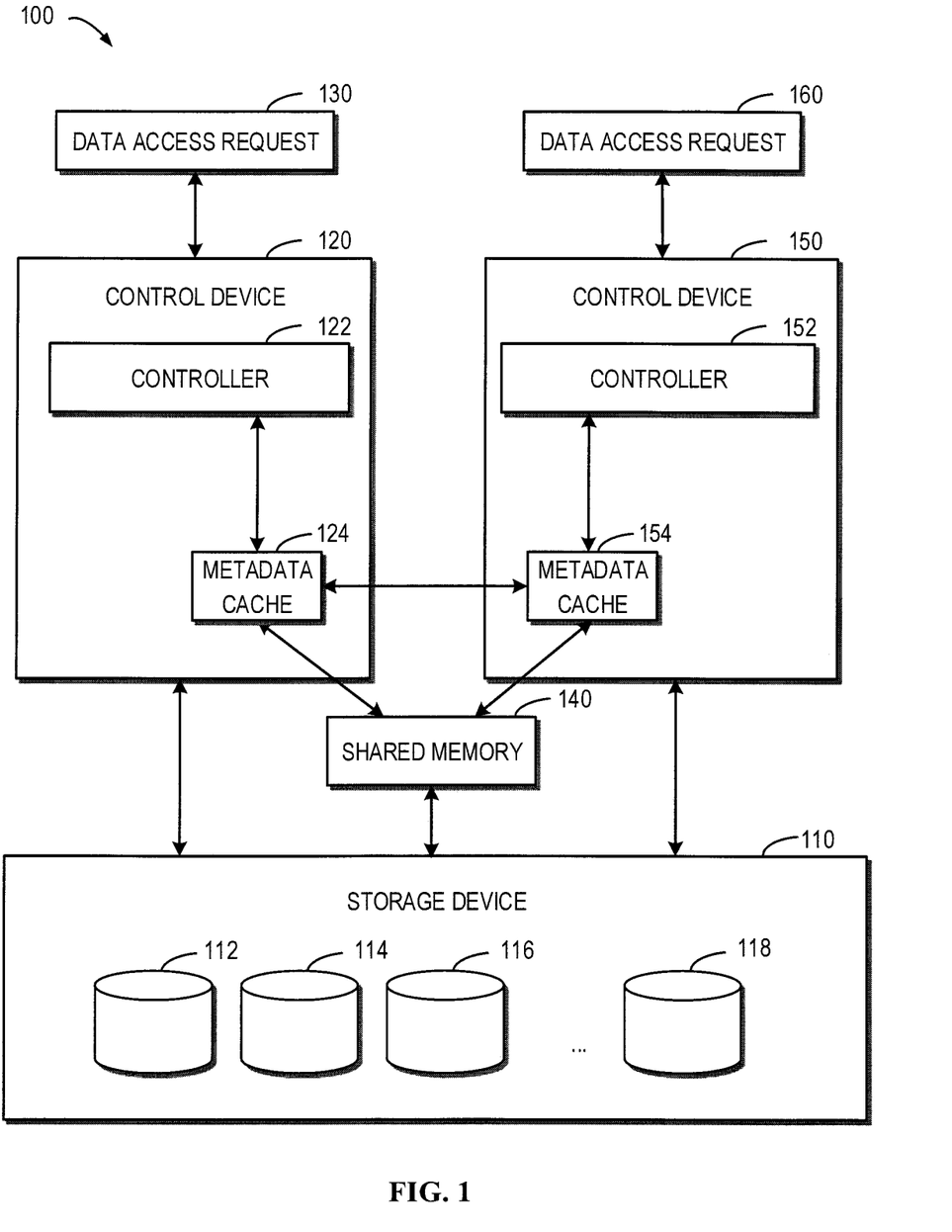
FIG. 1 shows a schematic diagram of an architecture of a storage system according to an embodiment of the present disclosure.

FIG. 1 shows a schematic diagram of an architecture of a storage system 100 according to an embodiment of the present disclosure. It should be appreciated that the structure and function of the storage system 100 are described for illustrative purposes only and are not intended to limit the scope of the disclosure. Embodiments of the present disclosure may also be applied to storage system 100 having different structures and/or functions.

As shown in FIG. 1, a storage device 110 for non-volatile storage of data is deployed in the storage system 100. The storage device 110 may include a plurality of storage device units 112, 114, 116, 118. It should be understood that the number of storage device units illustrated in FIG. 1 is merely by way of example and is not intended to limit the scope of the application. The storage device 110 may serve the user's data access request 130 via the control device 120. When the control device 110 receives the data access request 130 from the user, a controller 122 may be utilized to load user data to be accessed by the user and its corresponding metadata to the memory. In the example of FIG. 1, the user data may be loaded into for example a user data cache (not shown), and the corresponding metadata loaded into metadata cache 124. It should be understood that the user data cache and the metadata cache are distinguished by way of example only, without implying any limitation to the scope of the present disclosure, and in some embodiments, the same cache may be used to load the user data and metadata.

In FIG. 1, the storage system 100 further includes another control device 150 which may serve a data access request 160 from the user in parallel with the control device 120. For the sake of clarity, the control device 120 will also be referred to as a first control device 120, and the another control device 150 will also be referred to as a second control device 150. The first control device 120 and the second control device 150 may be, for example, a storage processor. In the embodiment of FIG. 1, the second control device 150 includes a controller 152 and a metadata cache 154, and has similar functions and structures as the first control device 120, which are not described in detail herein.

The first control device 120 and the second control device 150 share a high-speed memory 140, such as NVMe. The high-speed memory 140 may store data shared by the first control device 120 and the second control device 150, such as metadata or the like.

Figure 2:
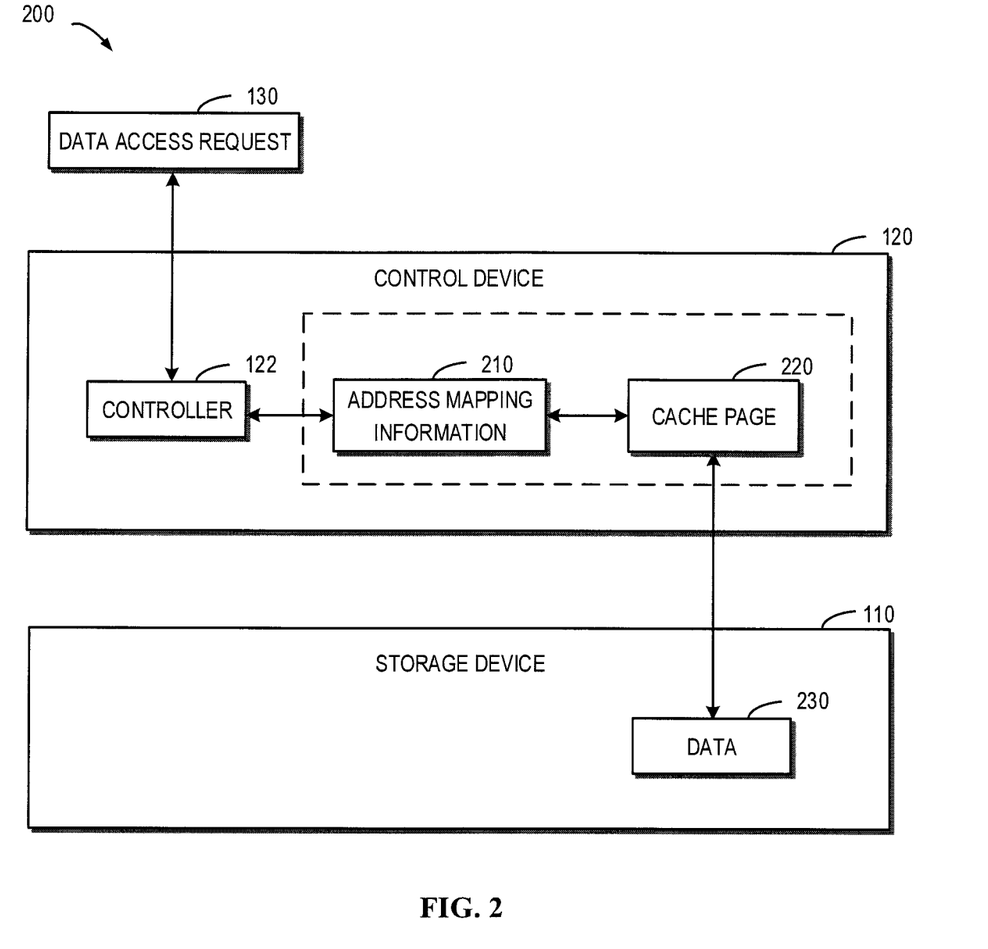
FIG. 2 is a schematic diagram showing a data access process in a storage system according to an embodiment of the present disclosure.

FIG. 2 schematically illustrates a schematic diagram of a data access process in the storage system 100 according to an embodiment of the present disclosure. As shown in FIG. 2, when the control device 120 receives the data access request 130, address information of the user data 230 to be accessed is first parsed from the data access request 130 by means of address mapping information 210, and the address information is loaded to the cache page 220. Here, the address information may include, for example, a starting address, an ending address, an address length of the user data 230 and a combination thereof in the storage device 110.

Figure 3:
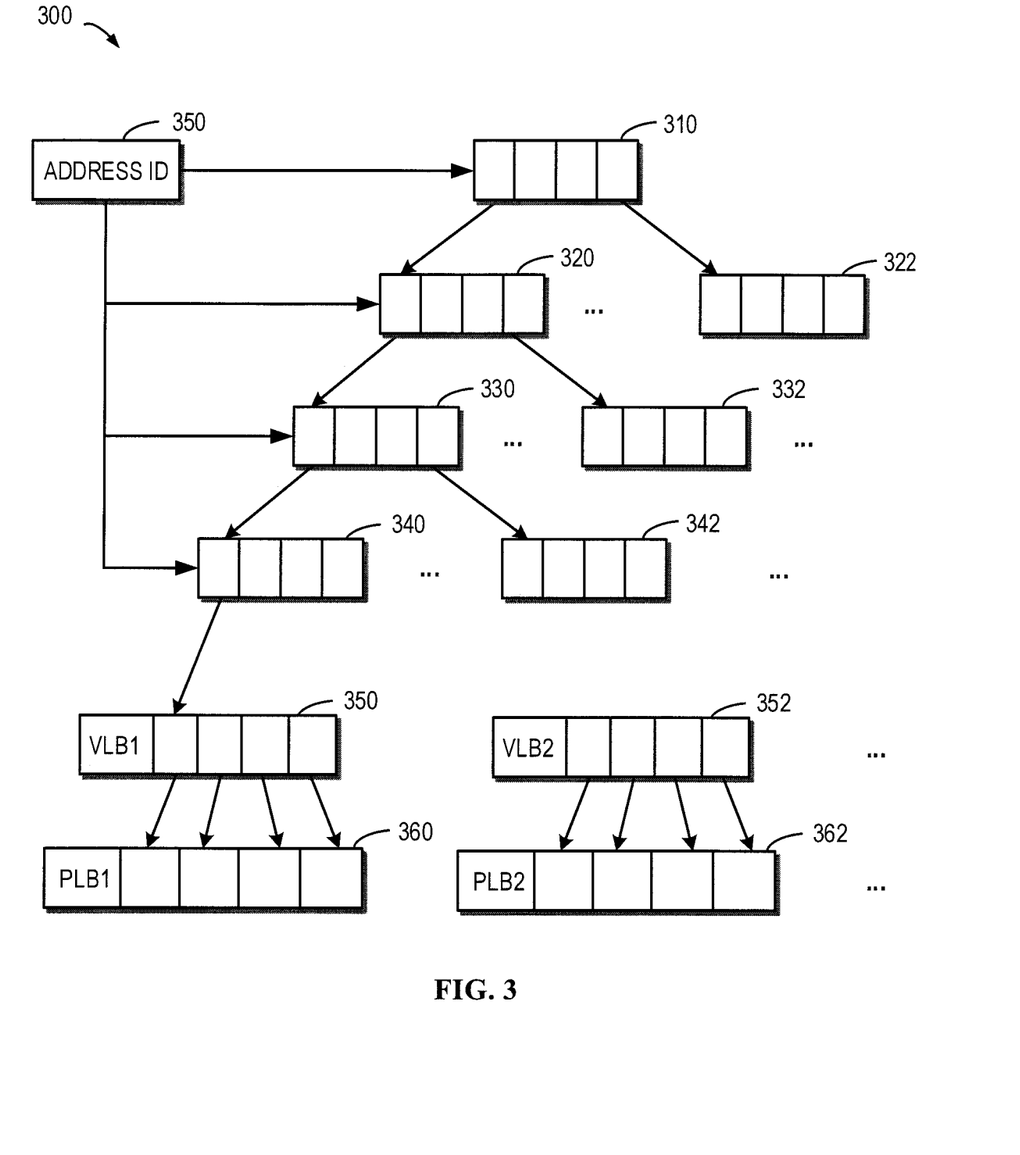
FIG. 3 shows a schematic diagram of a structure of address information according to an embodiment of the present disclosure.

FIG. 3 shows a schematic diagram of a structure of address information according to an embodiment of the present disclosure. As shown in FIG. 3, the address of the data in storage device 110 may be stored in a tree structure 300. The tree structure 300 may be, for example, a multi-fork tree or other tree structure. The tree structure 300 may have multiple levels. For example, in FIG. 3, a node 310 is at the first level of the tree, nodes 320 and 322 are at the second level of the tree, nodes 330 and 332 are at the third level of the tree, and nodes 340 and 342 are at the fourth level of the tree. In the example of FIG. 3, each node has four entries, and each entry points to a node of the next level. It should be understood that the tree structure 300 is shown by way of example only, and in some embodiments the addresses may be stored in other configurations.

Each user data has an address ID, which includes a set of addresses. Each address in the set of addresses describes a corresponding entry in each level in the tree structure, thereby implementing mapping from a logical address to a virtual addresses.

In the example of FIG. 3, the entries of the nodes 340, 342 located at the lowest level, namely, the fourth level, respectively point to the entries of one virtual logical block VLB, and the entries of each virtual logical block respectively point to a segment of data of a physical logical block PLB. The starting address and length of the corresponding data in the physical logic block are respectively recorded in each virtual logic block, thereby realizing mapping from the virtual address to the physical address.

Usually, when the user performs an operation such as modification for the user data in the user data cache, the metadata such as the address information corresponding to the user data is also changed. The changed metadata is copied to the high-speed memory 140 shared by the first control device 120 and the second control device 150 before being saved to the storage device 110.

Conventionally, when the metadata of the user data, in particular, the address information changes, all the contents of the cache page in which the changed metadata is located are copied into the high-speed memory 140, thereby causing data to be frequently written into the high-speed memory 140. This causes the high-speed memory to age too quickly, thereby reducing the service life, and increasing the cost of the storage system.

In order to at least partially solve the above problems and potential other problems, embodiments of the present disclosure provide a concept for managing metadata at a control device.

Figure 4:
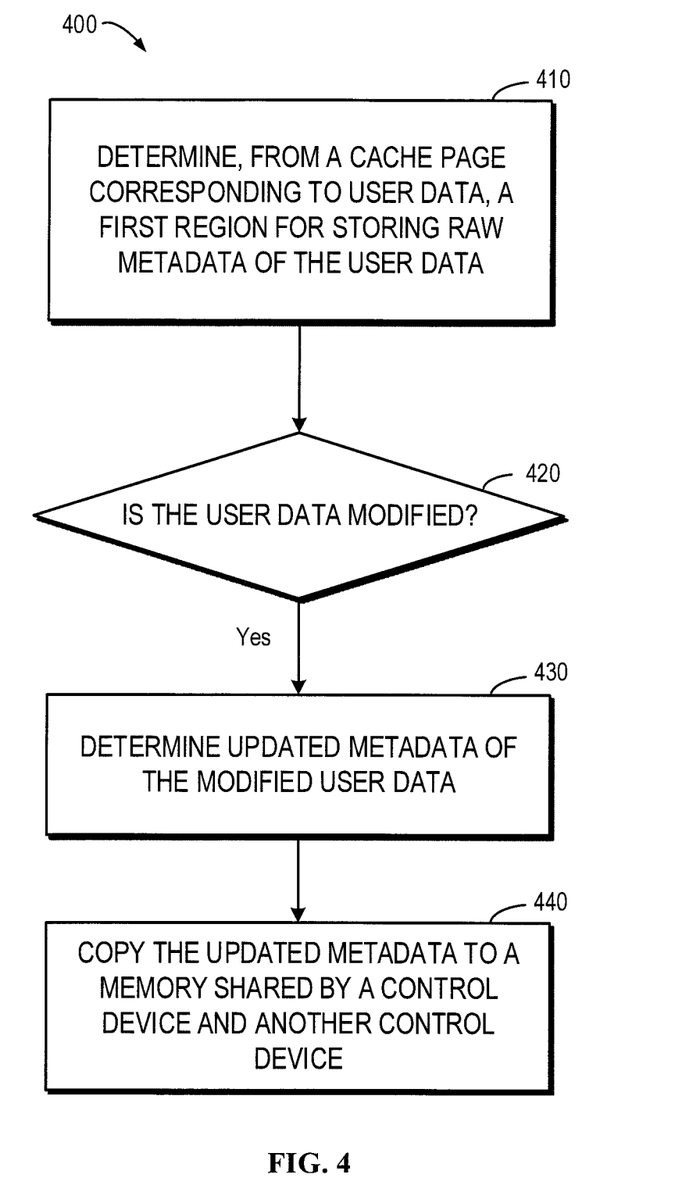
FIG. 4 illustrates a flow chart of a method for managing metadata at a control device according to an embodiment of the present disclosure.

FIG. 4 illustrates a flow chart of a method 400 for managing metadata at a control device according to an embodiment of the present disclosure. The method 400 can be, by way of example, implemented in the first control device 120 and the second control device 150 in FIG. 1.

At 410, a first region of raw metadata for storing user data is determined from a cache page corresponding to user data. The raw metadata includes address information in the storage system that is used to store the user data. In some embodiments, the raw metadata may be metadata in a cache page for storing user data that has not been modified. The address information may be, for example, a starting address, an ending address, an address length, a combination thereof, and the like.

In some embodiments, the first region in the cache page for storing the raw metadata may be determined based on the description information of the cache page. This will be described in detail below in conjunction with the specific embodiments of FIGS. 5A and 5B.

At 420, it is determined whether the user data has been modified. If yes, then at 430, updated metadata for the modified user data is determined to update the raw metadata in the first region. Here, the updated metadata refers to metadata for storing changed user data in a cache page due to a change in the user data.

In some embodiments, the address information in which the modified user data is stored in the storage system may be determined based on address mapping management information. Then, the updated metadata may be generated based on the determined address information. This will be described in detail below in conjunction with the specific embodiments of FIGS. 5A and 5B.

Further referring to FIG. 1, at 440, the updated metadata is copied to a high-speed memory shared by the control device and another control device such that a plurality of control devices can share changes in metadata in the high-speed memory.

With the concept in method 400, only the modified metadata portion of the cache page is copied into the high-speed memory. Therefore, the concept can reduce the usage frequency of storage units in the high-speed memory, thereby extending the service life of the high-speed memory and reducing the cost.

Additionally, in some embodiments, when the metadata on the second region of the cache page is updated, the first region and the second region are merged into a third region, and the metadata stored in the third region is copied to the shared high-speed memory. This will be described in more detail below in conjunction with FIGS. 6 and 7.

Additionally, in some embodiments, upon receiving an access request for user data, the access request is redirected to one of the control device and another control device based on the address information of the user data to be accessed. This will be described in more detail below in conjunction with FIG. 8.

Figure 5A:
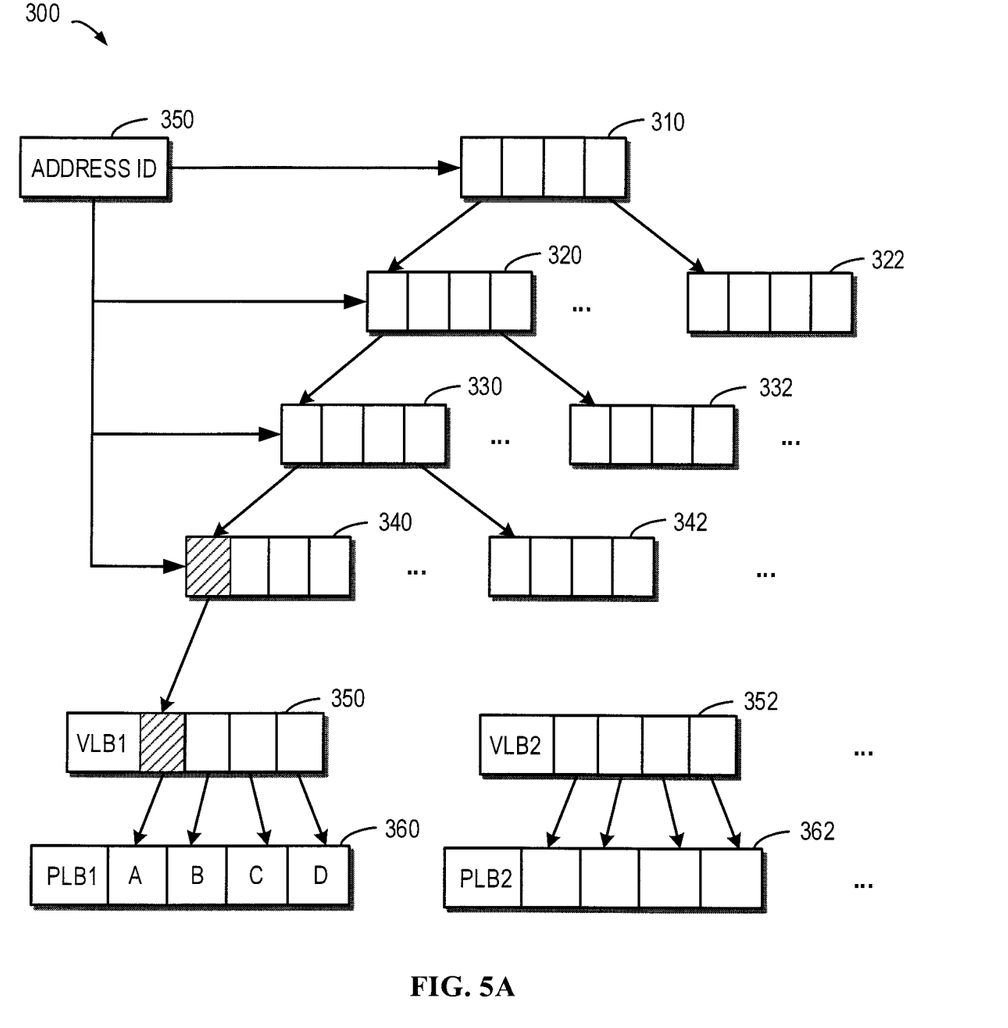
FIGS. 5A and 5B illustrate schematic diagrams of metadata changes according to an embodiment of the present disclosure.
Figure 5B:
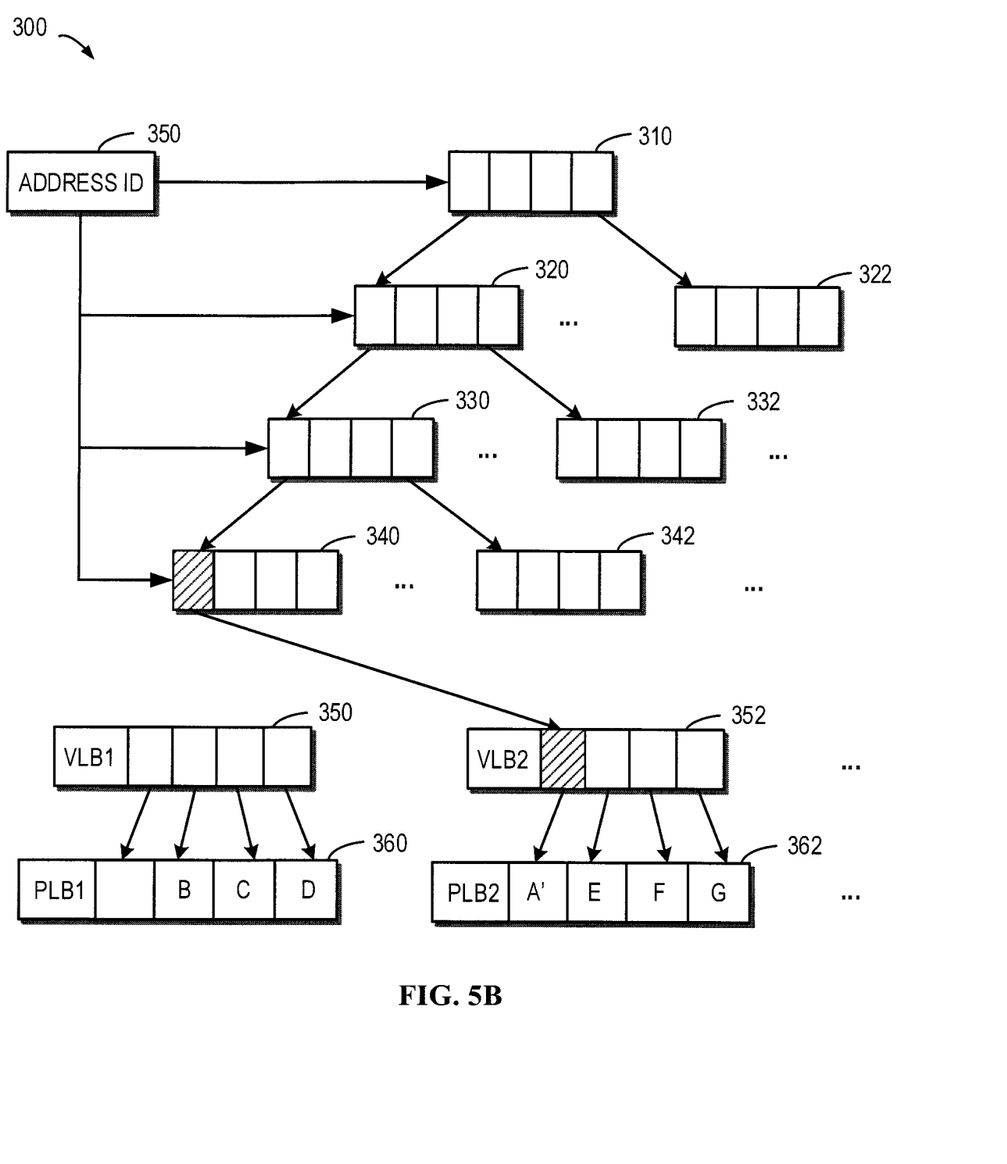

FIGS. 5A and 5B show schematic diagrams of metadata changes in accordance with an embodiment of the present disclosure. The process in which the metadata is modified along with the user data is described below in conjunction with FIGS. 5A and 5B.

In FIG. 5A, four segments of data A, B, C, and D are schematically stored in the first physical logic block PLB1. Each segment of data corresponds to an entry in the first virtual logic block VLB1. In the example of FIG. 5A, it is assumed that the data A is the user data to be modified. Wherein, the first entry (shaded portion in FIG. 5A) in the first virtual logic block VLB1 points to the data A, and the first entry (shaded portion in FIG. 5A) in the node 340 points to the first entry in the VLB1. In this example, the raw metadata of the user data includes the node 340 and the VLB1, and the first region of the raw metadata includes the first entry of the node 340 and the first entry of the VLB1. When the user accesses the user data A, the metadata associated with the data A is loaded into the cache page.

In FIG. 5B, the modified user data A' will be stored in the second physical logical block PLB2, which now corresponds to the first entry of the second virtual logical block VLB2. Therefore, the metadata in the first entry in node 340 needs to be modified to point to the first entry of second virtual logical block VLB2.

In an embodiment of the disclosure, in order to modify the metadata in a cache page, the following four application programming interfaces APIs can be used to perform the corresponding basic operations:

MMDC_SET (element, val): set the "element" to value "val";

MMDC_ADD (element, val): add the "element" with value "val";

MMDC_MEM_COPY (dst_ptr, src_ptr, len): copy the data of length "len" from a region "src" in the cache page to a region "dst";

MMDC_MEM_SET (ptr, val, len): set the region "ptr" of length "len" in the cache page to value "val".

While the above four basic operations are performed for the metadata in the cache page to update the metadata, for example, the modified start position and length in the metadata may be recorded to determine the modified region in the metadata.

In some embodiments, when performing the above four basic operations, description information for the cache page is modified, and a region for storing metadata of the modified user data in the cache page is determined based on the description information.

The modification of the description information of the cache page can be implemented in various ways. In some embodiments, the following codes may be used to make the above modifications:

```
#define MMDC_MARK_MODIFY(modify_addr, modify_len)    \
{                                                     \
    page_descriptor_t *pd;                            \
    pd = get_pd(modify_addr);                         \
    if (pd->modify_start_addr == NULL)                \
    {                                                 \
        pd->modify_start_addr = modify_addr;          \
        pd->len = modify_len;                         \
    }                                                 \
    else                                              \
    {                                                 \
        void *old_end_addr = pd->modify_start_addr + pd->len;  \
        if ((void*)modify_addr < pd->modify_start_addr)        \
        {                                             \
            pd->modify_start_addr = modify_addr;      \
            pd->len = old_end_addr - pd->modify_start_addr;  \
        }                                             \
```

```
            if (old_end_addr < (void*)modify_addr + modify_len)    \
        }                                                          \
            pd->len = (void*)modify_addr + modify_len -            \
            pd->modify_start_addr;                                 \
        }                                                          \
    }                                                              \
}                                                                  \
```

It should be understood that the above codes merely illustrates an example implementation. Those skilled in the art will appreciate that modifications to the description information of the cache page may also be implemented using other software forms, hardware forms, or a combination of software and hardware.

Figure 6:
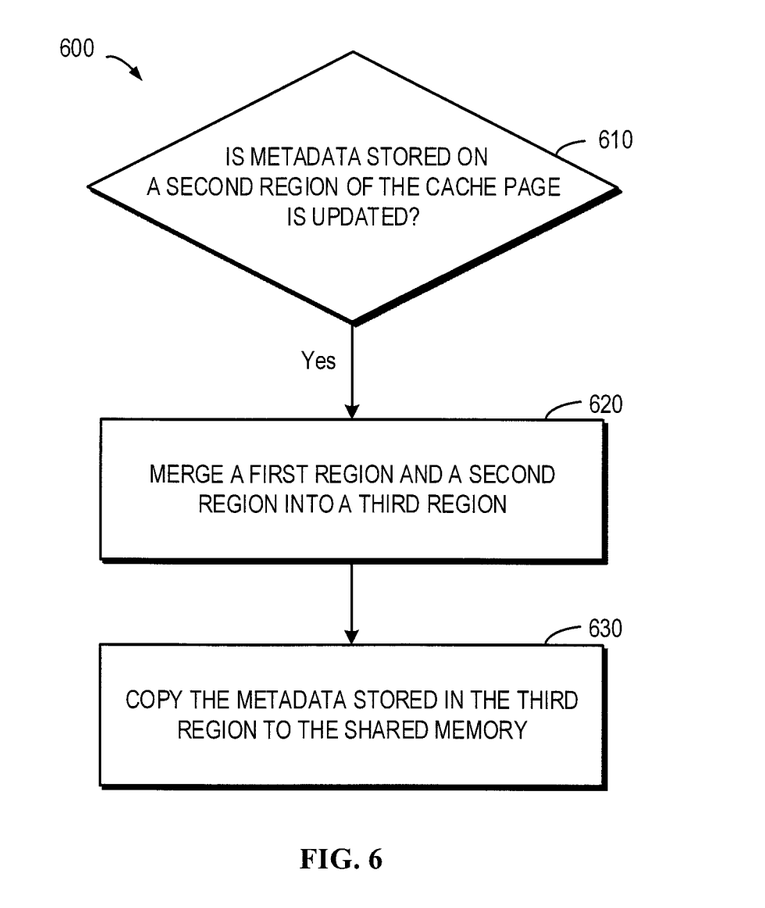
FIG. 6 illustrates a flow chart of merging updated metadata regions according to an embodiment of the present disclosure.

FIG. 6 illustrates a flow chart of merging updated metadata regions in accordance with an embodiment of the present disclosure. When the metadata in the cache page is simultaneously changed due to the modification of the plurality of user data, the following operations are performed according to an embodiment of the present disclosure in order to copy the changed portion of the metadata to the high-speed memory at one time.

At 610, it is determined whether there is a plurality of modified regions in the data stored on the cache page. This may also be determined, for example, by means of the description information of the cache page mentioned above. At 620, the modified first and second regions in the cache page are merged into a total third region. This merging process is described in more detail below in conjunction with FIG. 7.

Figure 7:
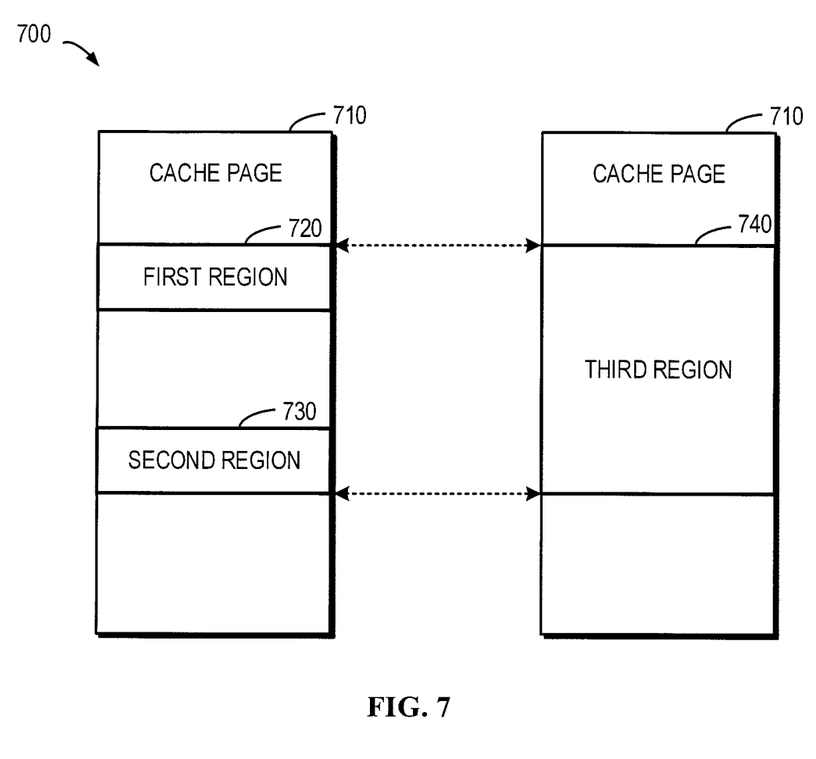
FIG. 7 shows a schematic diagram of an example of metadata region merging according to an embodiment of the present disclosure.

FIG. 7 shows a schematic diagram of an example of metadata region merging in accordance with an embodiment of the present disclosure. As shown in FIG. 7, there are two modified regions in the cache page 710, namely, a first region 720 and a second region 730. It should be understood that the number of modified regions is merely by way of example, and the scope of the present disclosure also includes a greater number of modified regions.

In one embodiment of the disclosure, merging the first region 720 and the second region 730 into the third region 740 includes determining a first starting position and a first length of the first region 720 in the cache page; determining a second starting position and a second length of the second region 730 in the cache page; determining a starting position of the third region 740 based on the first starting position and the second starting position; and based on the first starting position, the first length, the second starting position, and the second length, determining the length of the third region 740.

In some embodiments, a range of the third region may also be determined by means of the starting and ending positions, or the ending positions and lengths of the first and second regions.

Further referring to FIG. 6, at 630, the metadata stored in the merged third region is copied to the high-speed memory.

In some embodiments, the storage system 100 may include a plurality of control devices, such as first control device 120 and second control device 150, to serve a user's data access request. The first control device 120 and the second control device 150 can share a high-speed memory. When the first control device 120 in the storage system 100 for example copies the updated metadata to the high-speed memory, to ensure that the second control device 150 can acquire the updated data, the first control device 120 sends an update message to the second control device 150 to inform the second control device to use the updated metadata that has been stored in the shared high-speed memory, namely, the second control device 150 retrieves the metadata in the modified region in the cache page from the shared high-speed memory 140.

In some embodiments, the second control device 150 needs to retrieve from the storage device 110 raw metadata in the cache page corresponding to the modified user data. The updated metadata in the entire cache page is then derived based on the raw metadata and the modified metadata retrieved from the high-speed memory 140. Since the read speed of the storage device 110 is generally lower than the read speed of the high-speed memory 140, the above process may result in degradation of the performance of the storage system 100.

In order to avoid frequent occurrence of the above process, in some embodiments according to the present disclosure, the access request is redirected to one of the first control device 120 and the second control device 150 based on the address information of the user data to be accessed by the data access request. This redirection process is described in more detail below through the embodiment of FIG. 8.

Figure 8:
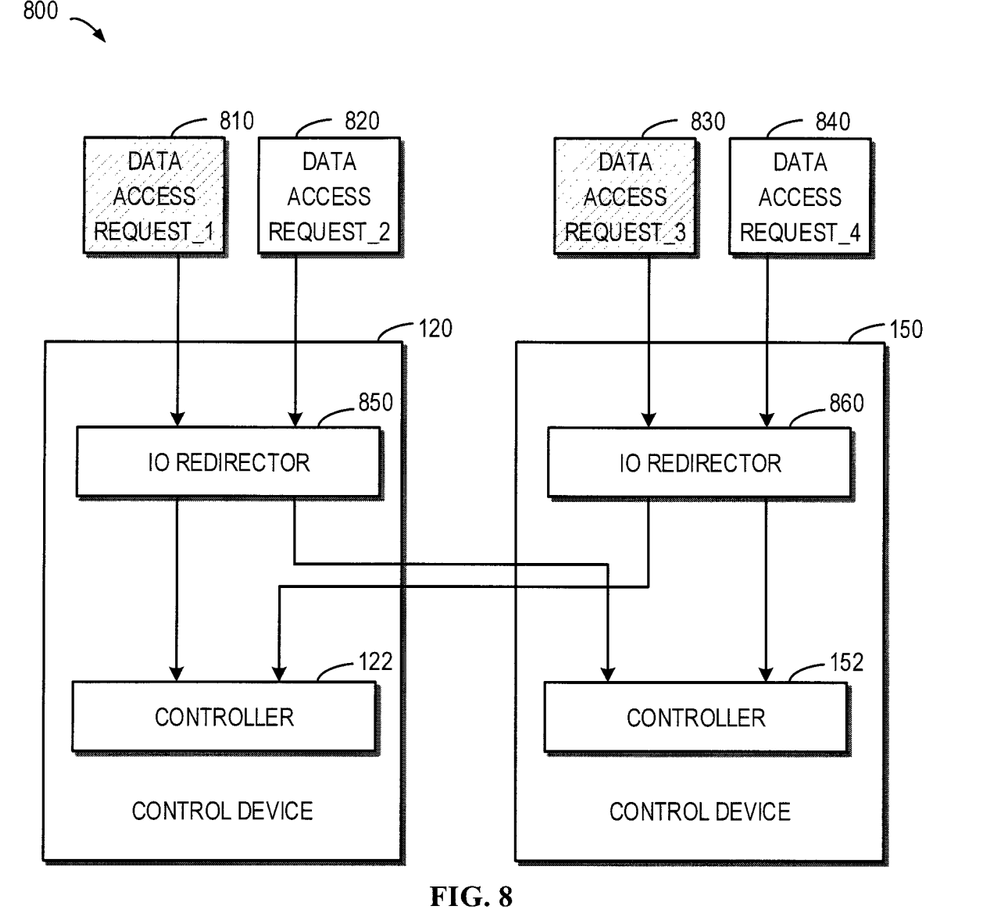
FIG. 8 illustrates a schematic diagram of redirecting an access request to a specific control device in accordance with an embodiment of the present disclosure.

FIG. 8 illustrates a schematic diagram of redirecting an access request to a specific control device in accordance with an embodiment of the present disclosure. As shown in FIG. 8, the first control device 120 receives two data access requests 810 and 820, and the second control device 150 receives two data access requests 830 and 840. In an IO redirector 850, these data access requests are redirected based on the address information of the user data that the data access requests 810, 820, 830, 840 desire to access. For example, when two data access requests 810 and 830 access the same user data, or when the address information pointing to the user data is located on the same sub-node of the tree structure, then the two data access requests 810 and 830 redirect to the same control device.

In this way, the frequency of the first control device 120 and the second control device 150 using the updated metadata of the modified user data stored in the shared high-speed memory may be reduced, thereby improving the performance of the entire storage system 100.

Figure 9:
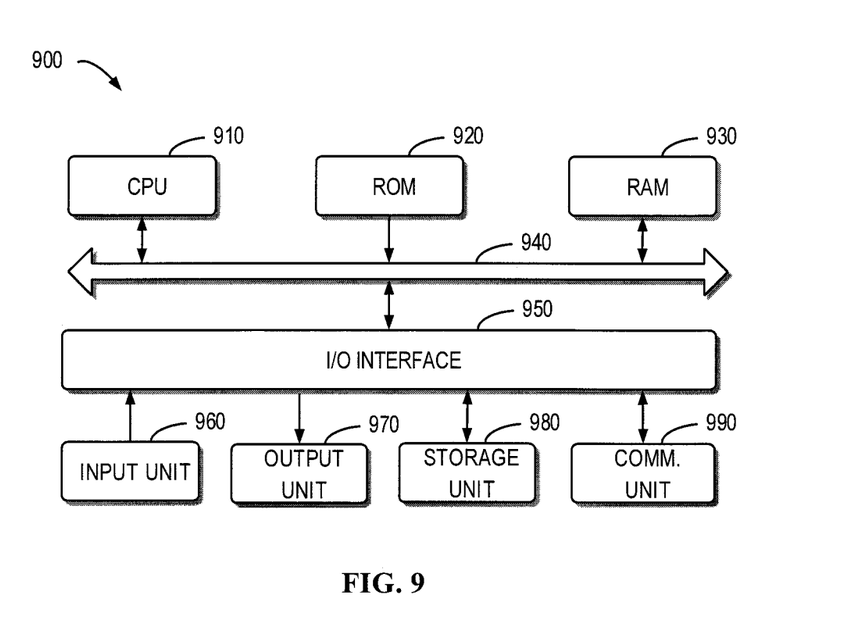
FIG. 9 shows a schematic block diagram of an example device that can be used to implement embodiments of the present disclosure.

FIG. 9 shows a schematic block diagram of an example device 900 for implementing embodiments of the present disclosure. For example, the controller 140 as shown in FIG. 1, FIG. 2 and FIG. 4 may be implemented by the device 900. As illustrated, the device 900 includes a central processing unit (CPU) 910, which may execute various suitable actions and processing based on the computer program instructions stored in a read-only memory (ROM) 920 or the computer program instructions loaded from a storage unit 980 into a random access memory (RAM) 930. The RAM 930 can also store all kinds of programs and data required by operating the storage device 600. CPU 910, ROM 920 and RAM 930 are connected to each other via a bus 940, to which an input/output (I/O) interface 950 is also connected.

A plurality of components in the device 900 are connected to the I/O interface 950, including: an input unit 960, such as keyboard, mouse and the like; an output unit 970, such as various types of display, loudspeakers and the like; a storage unit 980, such as magnetic disk, optical disk and the like; and a communication unit 990, such as network card, modem, wireless communication transceiver and the like. The communication unit 990 allows the device 900 to exchange information/data with other devices through computer networks such as Internet and/or various telecommunication networks.

Each procedure and processing described above, such as method 400 and/or 600, may be executed by a processing unit 910. As an example, in some embodiments, the method 400 and/or 600 may be implemented as computer software programs, which are tangibly comprised in a machine-readable medium, such as storage unit 980. In some embodiments, the computer program may be partially or completely loaded and/or installed to the device 900 via ROM 920 and/or the communication unit 990. When the computer program is loaded to RAM 930 and executed by CPU 910, one or more acts of the above described method 400 and/or 600 are implemented.

The present disclosure may be a method, a device, a system and/or a computer program product. The computer program product can include a computer-readable storage medium loaded with computer-readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical transmission fibers, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" progamming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, device (systems) and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method for managing metadata at a control device, comprising:
   determining, from a cache page corresponding to user data, a first region for storing raw metadata of the user data, the raw metadata comprising address information for storing the user data in a storage system;
   in response to the user data being modified, determining updated metadata of the modified user data to update the raw metadata in the first region;
   copying the updated metadata to a high-speed memory shared by the control device and another control device;
   in response to metadata stored on a second region of the cache page being updated, merging the first region and the second region into a third region; and
   copying the metadata stored in the third region to the shared high-speed memory;
   wherein merging the first region and the second region into a third region comprises:
   determining a first starting position and a first length of the first region in the cache page;
   determining a second starting position and a second length of the second region in the cache page;
   determining a starting position of the third region based on the first starting position and the second starting position; and
   determining a length of the third region, based on the first starting position, the first length, the second starting position, and the second length.

2. The method according to claim 1, wherein determining the first region comprises:
   determining the first region in the cache page for storing the raw metadata, based on description information of the cache page.

3. The method according to claim 1, wherein determining updated metadata of the modified user data comprises:
   determining, based on address mapping management information, address information of the modified user data stored in the storage system; and
   generating the updated metadata based on the determined address information.

4. The method according to claim 1, further comprising:
   sending an update message to the another control device to inform the another control device to use the updated metadata that has been stored in the shared high-speed memory.

5. The method according to claim 1, further comprising:
   in response to receiving an access request for the user data, redirecting the access request to one of the control device and the another control device based on address information of the user data to be accessed.

6. A control device for managing metadata, comprising:
   at least one processing unit;
   at least one memory coupled to the at least one processing unit and storing instructions executed by the at least one processing unit, the instructions, when executed by the at least one processing unit, causing the control device to perform actions comprising:
   determining, from a cache page corresponding to user data, a first region for storing raw metadata of the user data, the raw metadata including address information for storing the user data in a storage system;
   in response to the user data being modified, determining updated metadata of the modified user data to update the raw metadata in the first region;
   copying the updated metadata to a high-speed memory shared by the control device and another control device;
   in response to metadata stored on a second region of the cache page being updated, merging the first region and the second region into a third region; and
   copying the metadata stored in the third region to the shared high-speed memory;
   wherein merging the first region and the second region into a third region comprises:
   determining a first starting position and a first length of the first region in the cache page;
   determining a second starting position and a second length of the second region in the cache page;
   determining a starting position of the third region based on the first starting position and the second starting position; and
   determining a length of the third region, based on the first starting position, the first length, the second starting position, and the second length.

7. The control device according to claim 6, wherein determining the first region comprises:
   determining the first region in the cache page for storing the raw metadata, based on description information of the cache page.

8. The control device according to claim 6, wherein determining updated metadata of the modified user data comprises:
   determining, based on address mapping management information, address information of the modified user data stored in the storage system; and
   generating the updated metadata based on the determined address information.

9. The control device according to claim 6, wherein the actions further comprise:
   sending an update message to the another control device to inform the another control device to use the updated metadata that has been stored in the shared high-speed memory.

10. The control device according to claim 6, wherein the actions further comprise:
    in response to receiving an access request for the user data, redirecting the access request to one of the control device and the another control device based on address information of the user data to be accessed.

11. A computer program product having a non-transitory computer readable medium which stores a set of instructions to manage metadata at a control device; the set of instructions, when carried out by computerized circuitry, causing the computerized circuitry to perform a method of:

determining, from a cache page corresponding to user data, a first region for storing raw metadata of the user data, the raw metadata comprising address information for storing the user data in a storage system;

in response to the user data being modified, determining updated metadata of the modified user data to update the raw metadata in the first region;

copying the updated metadata to a high-speed memory shared by the control device and another control device;

in response to metadata stored on a second region of the cache page being updated, merging the first region and the second region into a third region; and copying the metadata stored in the third region to the shared high-speed memory;

wherein merging the first region and the second region into a third region comprises:

determining a first starting position and a first length of the first region in the cache page;

determining a second starting position and a second length of the second region in the cache page;

determining a starting position of the third region based on the first starting position and the second starting position; and determining a length of the third region, based on the first starting position, the first length, the second starting position, and the second length.

12. The computer program product according to claim 11, wherein determining the first region comprises:

determining the first region in the cache page for storing the raw metadata, based on description information of the cache page.

13. The computer program product according to claim 11, wherein determining updated metadata of the modified user data comprises:

determining, based on address mapping management information, address information of the modified user data stored in the storage system; and generating the updated metadata based on the determined address information.

14. The computer program product according to claim 11, wherein the method further includes:

sending an update message to the another control device to inform the another control device to use the updated metadata that has been stored in the shared high-speed memory.

15. The computer program product according to claim 11, wherein the method further includes:

in response to receiving an access request for the user data, redirecting the access request to one of the control device and the another control device based on address information of the user data to be accessed.

16. A storage system, comprising:

control devices constructed and arranged to access a set of storage devices; and a high-speed memory coupled with the control devices; each control device including:

at least one processing unit;

at least one memory coupled to the at least one processing unit and storing instructions executed by the at least one processing unit, the instructions, when executed by the at least one processing unit, causing the control device to perform actions comprising:

determining, from a cache page corresponding to user data, a first region for storing raw metadata of the user data, the raw metadata including address information for storing the user data;

in response to the user data being modified, determining updated metadata of the modified user data to update the raw metadata in the first region;

copying the updated metadata to the high-speed memory;

in response to metadata stored on a second region of the cache page being updated, merging the first region and the second region into a third region; and copying the metadata stored in the third region to the high-speed memory;

wherein merging the first region and the second region into a third region comprises:

determining a first starting position and a first length of the first region in the cache page;

determining a second starting position and a second length of the second region in the cache page;

determining a starting position of the third region based on the first starting position and the second starting position; and determining a length of the third region, based on the first starting position, the first length, the second starting position, and the second length.

17. The storage system according to claim 16, wherein determining the first region comprises:

determining the first region in the cache page for storing the raw metadata, based on description information of the cache page.

18. The storage system according to claim 16, wherein determining updated metadata of the modified user data comprises:

determining, based on address mapping management information, address information of the modified user data stored in the storage system; and generating the updated metadata based on the determined address information.

19. The storage system according to claim 16, wherein the actions further comprise:

sending an update message to another control device to inform the another control device to use the updated metadata that has been stored in the high-speed memory.

20. The storage system according to claim 16, wherein the actions further comprise:

in response to receiving an access request for the user data, redirecting the access request to another control device based on address information of the user data to be accessed.

* * * * *